United States Patent
Kawashima et al.

(10) Patent No.: US 7,487,026 B2
(45) Date of Patent: Feb. 3, 2009

(54) VEHICLE DRIVE FORCE CONTROL APPARATUS

(75) Inventors: Hideki Kawashima, Sagamihara (JP); Hideaki Ohtsuka, Yokohama (JP); Tatsuya Kamata, Atsugi (JP); Kouichi Shimizu, Sagamihara (JP); Hideyuki Saeki, Zama (JP); Masanori Aoyagi, Zama (JP)

(73) Assignee: Nissan Motor Co., Ltd., Yokohama (JP)

( * ) Notice: Subject to any disclaimer, the term of this patent is extended or adjusted under 35 U.S.C. 154(b) by 479 days.

(21) Appl. No.: 10/962,671

(22) Filed: Oct. 13, 2004

(65) Prior Publication Data

US 2005/0085980 A1 Apr. 21, 2005

(30) Foreign Application Priority Data

Oct. 15, 2003 (JP) .............................. 2003-355124

(51) Int. Cl.
*F02B 63/00* (2006.01)
(52) U.S. Cl. .............................. 701/53; 477/14; 477/15; 477/64; 477/68; 322/44
(58) Field of Classification Search .................. 701/53, 701/69, 84, 90, 54; 180/65.2; 322/28, 44; 477/14, 15, 20, 54, 64, 68, 73, 77, 84, 90, 477/91, 115; F02B 63/00
See application file for complete search history.

(56) References Cited

U.S. PATENT DOCUMENTS

| | | | | |
|---|---|---|---|---|
| 5,243,270 A | * | 9/1993 | Mayumi et al. | 322/28 |
| 6,628,104 B2 | * | 9/2003 | Yao et al. | 322/59 |
| 6,734,654 B2 | * | 5/2004 | Henneberger | 322/89 |
| 6,737,836 B2 | * | 5/2004 | Namai | 322/44 |
| 6,741,067 B2 | * | 5/2004 | Taniguchi et al. | 322/28 |
| 6,756,761 B2 | * | 6/2004 | Takahashi et al. | 318/599 |
| 6,823,250 B2 | * | 11/2004 | Yamaguchi et al. | 701/51 |
| 6,902,018 B2 | * | 6/2005 | Hisada et al. | 180/65.1 |
| 6,909,263 B2 | * | 6/2005 | Xu et al. | 322/29 |
| 7,004,018 B2 | * | 2/2006 | Kadota et al. | 73/115.02 |
| 7,116,083 B2 | * | 10/2006 | Kalman et al. | 322/59 |
| 2002/0139592 A1 | * | 10/2002 | Fukasaku et al. | 180/65.2 |
| 2004/0008010 A1 | * | 1/2004 | Ebrahim et al. | 322/44 |
| 2004/0010360 A1 | * | 1/2004 | Kishibata et al. | 701/54 |
| 2006/0111213 A1 | * | 5/2006 | Bucknor et al. | 475/5 |
| 2006/0145669 A1 | * | 7/2006 | Kouwa et al. | 322/28 |

FOREIGN PATENT DOCUMENTS

JP S54-22509 2/1979

(Continued)

*Primary Examiner*—Tuan C To
(74) *Attorney, Agent, or Firm*—Global IP Counselors, LLP

(57) ABSTRACT

A vehicle drive force control apparatus is provided that can stabilize the output of the electric motor even if the engine rotational speed experiences an acute change. The output of an engine is delivered to the left and right front wheels through a transmission and also to an electric generator. The output voltage of the electric generator is supplied to an electric motor and the output of the electric motor drives the left and right rear wheels. The drive force control device predicts if the rotational speed of the engine will decrease or increase acutely based on the upshifting and downshifting of the transmission and adjusts the field current of the electric generator up or down before the acute change in the engine rotational speed occurs.

7 Claims, 13 Drawing Sheets

FOREIGN PATENT DOCUMENTS

| | | |
|---|---|---|
| JP | S60-133140 U | 9/1985 |
| JP | H11-4506 A | 1/1999 |
| JP | 2000-115912 A | 4/2000 |
| JP | 2000-318473 A | 11/2000 |
| JP | 2003-209902 A | 7/2003 |

* cited by examiner

VEHICLE DRIVE FORCE CONTROL APPARATUS

BACKGROUND OF THE INVENTION

1. Field of the Invention

The present invention relates to a drive force control device for a vehicle having a wheel or set of wheels driven by an internal combustion engine and an electric generator also driven by the internal combustion engine.

2. Background Information

One example of a drive force control device for a vehicle in which the front wheels are driven by an engine, the rear wheels are driven by an electric motor, and the electric motor is driven by electric power generated by an electric generator driven by the engine is disclosed in Japanese Laid-Open Patent Publication No. 2000-318473. When the invention disclosed in that publication is used, it is not necessarily mandatory to have a battery that supplies electric power to the electric motor.

In view of the above, it will be apparent to those skilled in the art from this disclosure that there exists a need for an improved drive force control device. This invention addresses this need in the art as well as other needs, which will become apparent to those skilled in the art from this disclosure.

SUMMARY OF THE INVENTION

It has been discovered that with the vehicle drive force control apparatus described in Japanese Laid-Open Patent Publication No. 2000-318473, the voltage supplied to the electric motor is affected by the operating state of the engine driving the electric generator. For example, if the engine rotational speed temporarily drops for some reason, the electric generator output will become insufficient and the electric motor will not be supplied with the required voltage for a temporary period. Thus, the motor torque driving the rear wheels will temporarily become too small.

Conversely, if the engine rotational speed temporarily rises acutely while the engine is running at a high rotational speed, there is the possibility that the voltage supplied to the electric motor will become high for a temporary period.

The present invention was conceived in view of these shortcomings and one object is to provide a vehicle drive force control apparatus that can stabilize the output delivered to an electric motor or other electromechanical device when the rotational speed of the engine undergoes an acute change.

In order to achieve the aforementioned object, the present invention provides a vehicle drive force control apparatus that includes a main drive source, an electric generator, an electromechanical device and a controller. The main drive source is configured and arranged to drive a first wheel. The electric generator is configured and arranged to be driven by the main drive source. The electromechanical device is configured and arranged to receive electric power from the electric generator. The controller operatively is coupled to at least one of the electric generator and electromechanical device. The controller comprises a predicting section and an output stabilizing section. The predicting section is configured to predict a sudden acute change in one of the rotational speed of the main drive source and the voltage delivered from the electric generator to the electromechanical device. The output stabilizing section is configured to adjust one of the field current of the electric generator in advance of the acute change to suppress a change in an output of the electric generator that will result from the sudden acute change in the rotational speed of the main drive source, and the magnitude of a field magnetic flux of the electric motor in advance of the acute change to suppress a change in an output of the electric motor that will result from a sudden acute change in the voltage delivered from the electric generator to the electromechanical device.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

First Embodiment

Figure 1:
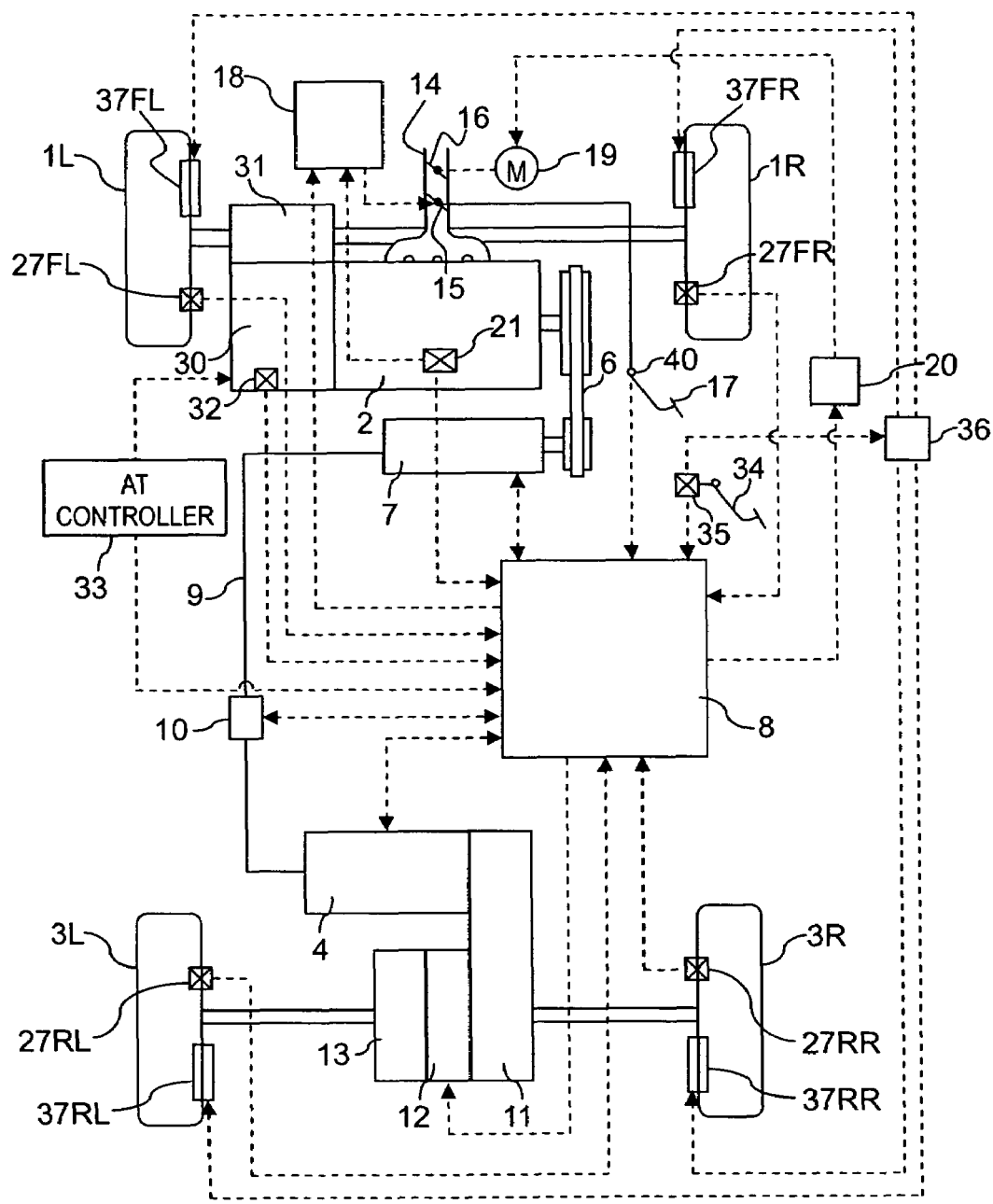
FIG. 1 is a schematic block diagram of a vehicle equipped with a vehicle drive force control apparatus in accordance with a first embodiment of the present invention.

Referring initially to FIG. 1, a vehicle is schematically illustrated that is equipped with a vehicle drive system having a vehicle driving force control apparatus in accordance with a first embodiment of the present invention. The vehicle driving force control apparatus is configured and arranged as explained below.

As shown in FIG. 1, the vehicle in accordance with this embodiment has left and right front wheels 1L and 1R that are driven by an internal combustion engine or main drive source 2, and left and right rear wheels 3L and 3R that are driven by an electric motor or subordinate electric drive source 4, which is preferably a direct current (DC) electric motor. Thus, the vehicle is a so-called standby-type four-wheel drive vehicle in which the front wheels 1L and 1R serve as the main drive wheels, while the rear wheels 3L and 3R serve as the subordinate drive wheels. An endless drive belt 6 transfers power from the internal combustion engine 2 to an electric generator 7, which supplies electrical energy to the electric motor 4. In other words, a portion of the rotary torque Te of the engine 2 is transmitted to the electric generator 7 the endless drive belt 6. The electric generator 7 rotates at a rotational speed Nh equal to the rotational speed Ne of the engine 2 multiplied by the pulley ratio.

The generator 7 utilizes the power transmitted thereto by the endless drive belt 6 to generate electric power. The electric power generated by the electric generator 7 can be delivered to the electrical motor 4 through a power cable or electric wire 9. A junction box 10 is provided at an intermediate point along the electrical wire 9. The output of the electric motor 4 passes successively through a reduction gear 9, an electromagnetic clutch 10, and a differential gear 11 before being transmitted to the rear wheels 1RL and 1RR.

The drive shaft of the electric motor 4 is arranged and configured such that it can be connected to the rear wheels 3L and 3R through a reduction gear 11, a clutch 12 and a differential gear 13.

The 4WD controller 8 constitutes a predicting section and an output stabilizing section to carry out the control of the electric motor 4 and the generator 7 as discussed below. The 4WD controller 8 preferably includes a microcomputer with a 4WD control program. The 4WD controller 8 is operatively coupled to the internal combustion engine 2, the electric motor 4, the generator 7 and other components as discussed below to control the torque output Te applied to the left and right front wheels 1L and 1R by the internal combustion engine 2, the torque applied to the left and right rear wheels 3L and 3R by the electric motor 4 and the load torque TG of the generator 7 on the internal combustion engine 2 as discussed below. The 4WD controller 8 can also include other conventional components such as an input interface circuit, an output interface circuit, and storage devices such as a ROM (Read Only Memory) device and a RAM (Random Access Memory) device. It will be apparent to those skilled in the art from this disclosure that the precise structure and algorithms of the 4WD controller 8 can be any combination of hardware and software that will carry out the functions of the present invention. In other words, "means plus function" clauses as utilized in the specification and claims should include any structure or hardware and/or algorithm or software that can be utilized to carry out the function of the "means plus function" clause.

The output torque Te of the engine 2 is delivered to the left and right front wheels 1L and 1R after passing through an automatic transmission 30 equipped with a torque converter and a differential gear 31. The transmission 30 is provided with a shift position detecting section or device 32 that is arranged and configured to detect the current shift range of the transmission 30. The shift position detecting device 32 sends a signal indicating the detected shift position to a 4WD controller 8.

The transmission 30 executes gear shifting in response to a shift command from a transmission control unit 33. The transmission controller or control unit 33 holds tables or the like, such as those shown in FIGS. 7 and 8, containing information describing the shift schedule of the transmission based on the vehicle speed and the accelerator position. When the transmission control unit 33 determines that the vehicle will pass through a shift point based on the current vehicle speed and accelerator position, the transmission control unit 33 issues a shift command to the transmission 30.

The transmission control unit 33 preferably includes a microcomputer with a transmission control program. The transmission control unit 33 is operatively coupled to the transmission 30 and the 4WD controller 8. The transmission control unit 33 can also include other conventional components such as an input interface circuit, an output interface circuit, and storage devices such as a ROM (Read Only Memory) device and a RAM (Random Access Memory) device.

The engine 2 has an intake manifold coupled thereto with an air intake passage 14 that has a main throttle valve 15 and a subordinate throttle valve 16 installed therein. The opening degree of the main throttle valve 15 is adjusted/controlled in accordance with the depression amount of an accelerator pedal 17, which thus serves as a device for specifying the desired throttle opening (i.e., specifying the desired degree of acceleration). The main throttle valve 15 is either mechanically linked to the depression amount of the accelerator pedal 17 or electrically controlled/adjusted by an engine controller 18 in accordance with a depression amount value issued by an accelerator sensor 40 arranged and configured to detect the depression amount of the accelerator pedal 17. The depression amount value detected by the accelerator sensor 40 is also fed to the 4WD controller 8.

The subordinate throttle valve 16 has a stepper motor 19 that serves as an actuator and its opening degree is adjusted/controlled by the rotational angle of the stepper motor 19, which is determined based on the step count. The rotational angle of the stepper motor 19 is adjusted/controlled by a drive signal issued from a motor controller 20. The subordinate throttle valve 16 is provided with a throttle sensor that is configured to detect the throttle opening of the subordinate throttle valve 16. The throttle opening value detected by the throttle sensor is used to execute feedback control of the step count of the stepper motor 19. By adjusting the throttle opening of the subordinate throttle valve 16 to a smaller opening than the opening of the main throttle valve 15, the output torque of the engine 2 can be controlled independently of the operation of the accelerator pedal by the driver.

An engine rotational speed sensor 21 is also provided to detect the rotational speed of the engine 2 and a signal indicating the rotational speed detected by the engine rotational speed sensor 21 is fed to the engine controller 18 and the 4WD controller 8.

A brake stroke sensor 35 detects the depression amount of the brake pedal 34. The brake stroke sensor 35 sends the detected brake pedal depression amount to a brake controller 36 and the 4WD controller 8.

Based on the brake pedal depression amount received from the brake stroke sensor 35, the brake controller 36 controls the brake force applied to the wheels 1L, 1R, 3L and 3R by brake devices 37FL, 37FR, 37RL, and 37RR.

Figure 2:
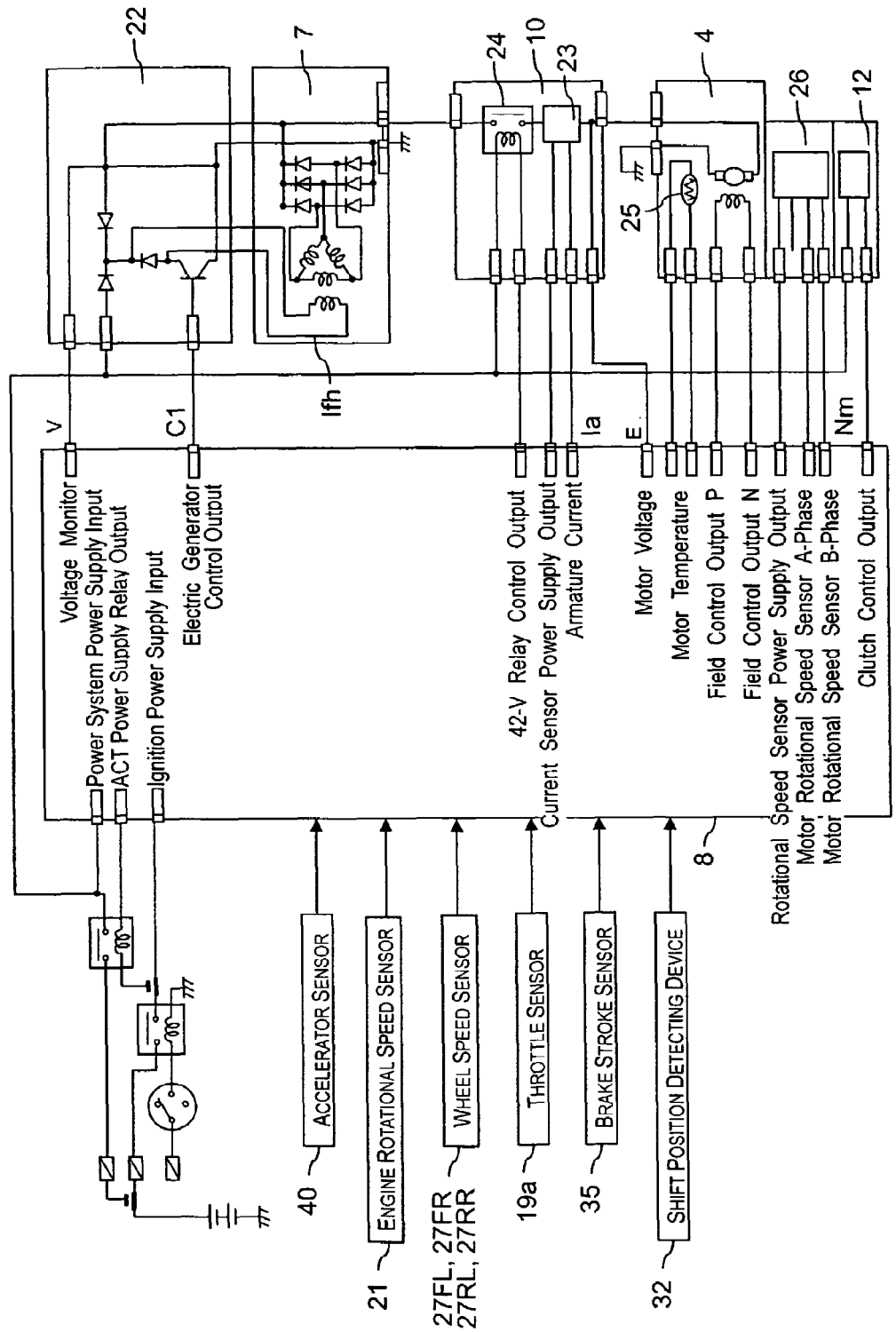
FIG. 2 is a block circuit diagram illustrating a control system configuration for the vehicle drive force control apparatus illustrated in FIG. 1 in accordance with the first embodiment of the present invention.

As shown in FIG. 2, the electric generator 7 is provided with a voltage regulator 22 for regulating the output voltage V of the generator 7. Based on a generator control command value c1 (duty ratio) issued from the 4WD controller 8, the voltage regulator 22 controls the field current Ifh of the electric generator 7 and thereby controls the generator load torque Th imposed on the engine 2 by the generator 7 and the output voltage V generated by the generator 7. In short, the voltage regulator is configured such that it can receive the generator control command value c1 (duty ratio) from the 4WD controller 8 and adjust the field current Ifh of the electric generator 7 to a value corresponding to the generator control command value c1 while also detecting the output voltage V of the electric generator 7 and reporting the same to the 4WD controller 8. The rotational speed Nh of the electric generator 7 can be calculated based on the rotational speed Ne of the engine 2 and the pulley ratio.

A current sensor 23 is provided inside the junction box 10. The current sensor 23 detects the current value Ia of the electric power delivered from the electric generator 7 to the electric motor 4 and sends an armature current signal indicating the detected current value to the 4WD controller 8. The voltage of the electrical wire 9, i.e., the voltage of the electric motor 4, is also detected by the 4WD controller 8. A relay 24 connects and disconnects the voltage (current) supplied to the electric motor 4 based on a command issued from the 4WD controller 8.

The field current Ifm of the electric motor 4 is controlled by commands from the 4WD controller 8 such that the drive torque of the motor 4 is adjusted to the target motor torque. A thermistor 25 is provided to measure the temperature of the electric motor 4.

A motor rotational speed sensor 26 is provided to detect the rotational speed Nm of drive shaft of the electric motor 4. The motor rotational speed sensor 26 sends a rotational speed signal indicating the detected rotational speed of the motor 4 to the 4WD controller 8.

A wheel speed sensor 27FL, 27FR, 27RL, 27RR is provided on each of the wheels 1L and 1R, 3L and 3R. Each wheel speed sensor 27FL, 27FR, 27RL, 27RR sends a pulse signal corresponding to the rotational speed of the respective wheel 1L and 1R, 3L and 3R to the 4WD controller 8 as a wheel speed detection value.

Figure 3:
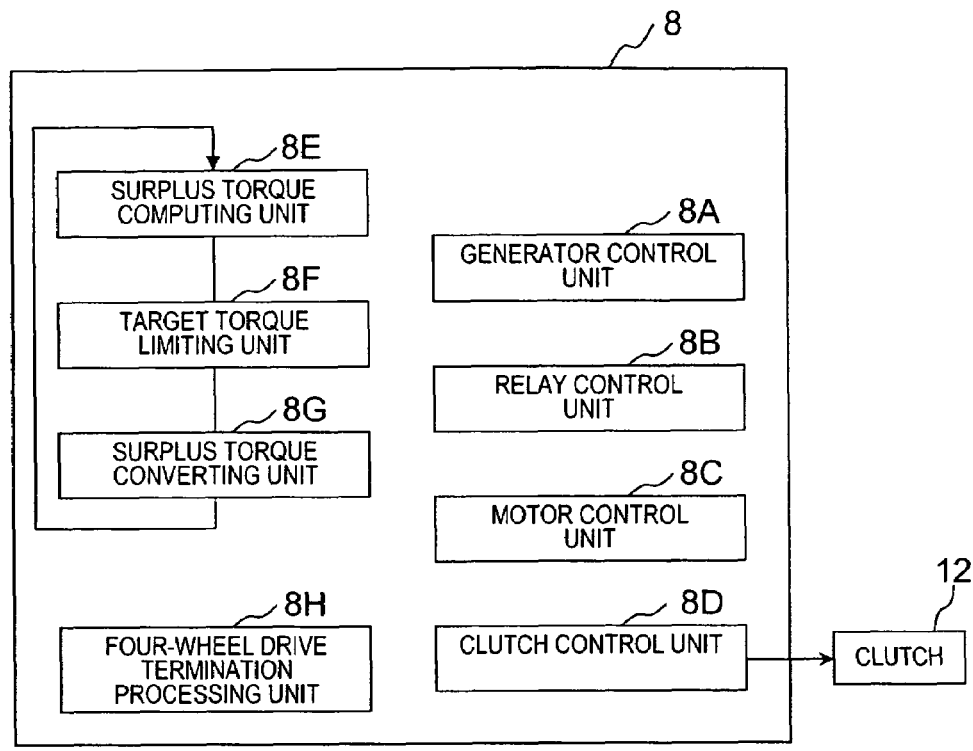
FIG. 3 is a block diagram showing the 4WD controller for the vehicle driving force control apparatus in accordance with the first embodiment of the present invention.

As shown in FIG. 3, the 4WD controller 8 is provided with a generator control unit or section 8A, a relay control unit or section 8B, a motor control unit or section 8C, a clutch control unit or section 8D, a surplus torque computing unit or section 8E, a target torque limiting unit or section 8F, a surplus torque converting unit or section 8G, and a four-wheel drive termination processing unit or section 8H.

The generator control unit 8A employs the voltage regulator 22 to monitor the output voltage of the electric generator 7 and to adjust the field current Ifh in accordance with the generator command value c1 so as to control the output of the electric generator 7.

The relay control unit 8B controls the connection and disconnection of electric power from the electric generator 7 to the electric motor 4.

The motor control unit 8C adjusts the field current Ifm of the electric motor 4 and thereby adjusts the torque of the electric motor 4 to the required value.

The clutch control unit 8D controls the state of the clutch 12 and puts the clutch 12 into the engaged (connected) state when the vehicle is determined to be in a four-wheel drive mode.

Based on the various input signals, the surplus torque computing unit 8E, the target torque limiting unit 8F, and the surplus torque converting unit 8G execute their respective processing sequences in series (i.e., first 8E, then 8F, then 8G, back to 8E, etc.) in accordance with a prescribed sampling time.

Figure 4:
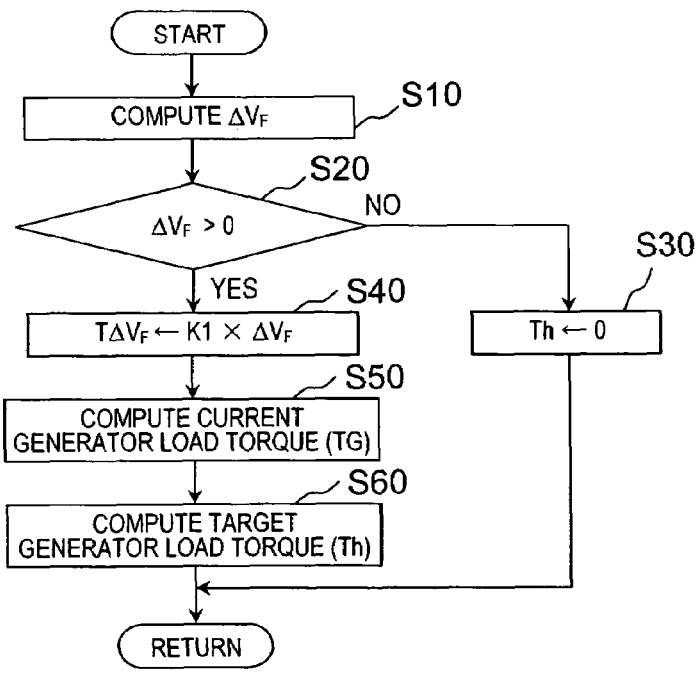
FIG. 4 is a flow chart illustrating the processing sequence executed by a surplus torque computing section or unit for the vehicle driving force control apparatus in accordance with the first embodiment of the present invention.

The processing sequence executed by the surplus torque computing unit 8E will now be described with reference to FIG. 4.

In step S10, based on the signals from the wheel speed sensors 27FL, 27FR, 27RL, 27RR, the surplus torque computing unit 8E subtracts the average wheel speed of the rear wheels 3L and 3R (subordinate drive wheels) from the average wheel speed of the front wheels 1L and 1R (main drive wheels) in order to find the slippage velocity $\Delta V_F$, which indicates the amount of acceleration slippage of the front wheels 1R, 1L. Then it proceeds to step S20.

An example of how the slippage velocity $\Delta V_F$ is computed is presented in the next paragraph.

First the average front wheel speed $V_{Wf}$ is calculated as the average of the wheel speeds of the left and right front wheels 1L and 1R and the average rear wheel speed $V_{Wr}$ is calculated as the average of the wheel speeds of the left and right rear wheels 3L and 3R.

$$V_{Wf}=(V_{Wfl}+V_{Wfr})/2 \text{ and } V_{Wr}=(V_{Wrl}+V_{Wrr})/2.$$

The slippage velocity (amount of acceleration slippage) $\Delta VF$ of the front wheels 1L and 1R (main drive wheels) is calculated as the difference between the average front wheel speed VWf and the average rear wheel speed VWr using the equation shown below.

$$\Delta V_F = V_{Wf} - V_{Wr}$$

In step S20, the surplus torque computing unit 8E determines if the slippage velocity $\Delta V_F$ is greater than a prescribed value, such as zero. If the slippage velocity $\Delta V_F$ is equal to or less than 0, it estimates that the front wheels 1L and 1R are not undergoing acceleration slippage and proceeds to step S30, where it sets 0 as the value of Th and returns to the beginning of the control sequence.

Meanwhile, if the slippage velocity $\Delta V_F$ is determined to be greater than 0 in step S20, then the surplus torque computing unit 8E estimates that the front wheels 1L and 1R are undergoing acceleration slippage and proceeds to step S40.

In step S40, the surplus torque computing unit 8E computes the amount of torque $T\Delta V_F$ that must be absorbed in order to suppress the acceleration slippage of the front wheels 1L and 1R using the equation shown below and proceeds to step S50. The absorption torque $T\Delta V_F$ is proportional to the acceleration slippage amount.

$$T\Delta V_F = K1 \times \Delta V_F$$

where: the K1 is a gain found experimentally.

In step S50, the surplus torque computing unit 8E computes the current load torque TG of the electric generator 7 based on the equation shown below and proceeds to step S60.

$$TG = K2 \frac{V \times Ia}{K3 \times Nh}$$

where: V: voltage of the generator 7,
Ia: armature current of the generator 7,
Nh: rotational speed of the generator 7,
K3: efficiency, and
K2: coefficient.

In step S60, the surplus torque computing unit 8E computes surplus torque, i.e., the target generator load torque Th to be born by the electric generator 7, using the equation shown below.

$$Th = TG + T\Delta V_F.$$

Figure 5:
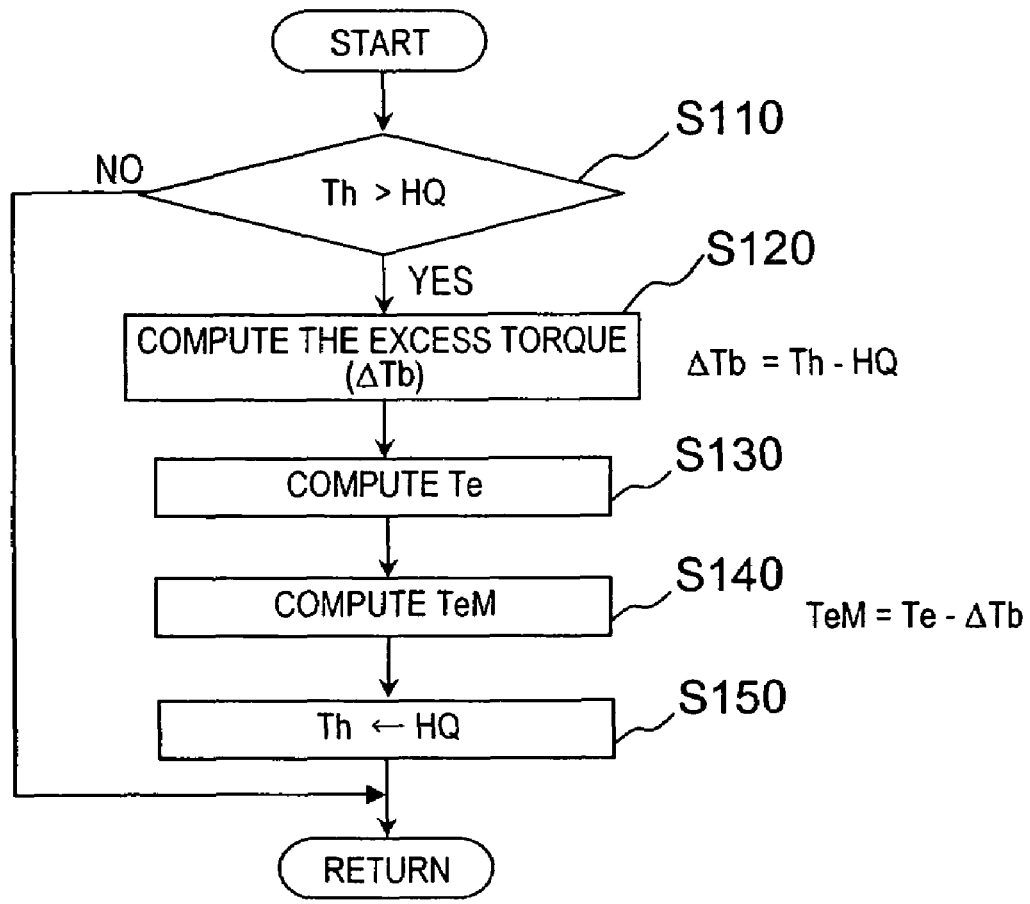
FIG. 5 is a flow chart illustrating the processing sequence executed by a target torque control section or unit for the vehicle driving force control apparatus in accordance with the first embodiment of the present invention.

The processing sequence executed by the target torque limiting unit 8F will now be described with reference to FIG. 5.

In step S110, the target torque limiting unit 8F determines if the target generator load torque Th is larger than the maximum load capacity HQ of the electric generator 7. If it determines that the target generator load torque Th is equal to or less than the maximum load capacity HQ of the electric generator 7, then it returns to the beginning of the control sequence. Meanwhile, if it determines that the target generator load torque Th is larger than the maximum load capacity HQ of the electric generator 7, it then proceeds to step S120.

In step S120, the target torque limiting unit 8F calculates the excess torque $\Delta Th$, which is the amount by which the target generator load torque Th exceeds the maximum load torque HQ, using the equation shown below and proceeds to step S130.

$$\Delta Tb = Th - HQ$$

In step S130, the target torque limiting unit 8F calculates the current engine torque Te based on the signals from the engine rotational speed sensor 21 and the throttle sensor.

In step S140, the target torque limiting unit 8F computes the engine torque upper limit value TeM by subtracting the excess torque $\Delta Tb$ from the engine torque Te and sends the computed engine torque upper limit value TeM to the engine controller 18.

$$TeM = Te - \Delta Tb$$

In step S150, the target torque limiting unit 8F substitutes the maximum load capacity HQ as the target generator load torque Th.

Figure 6:
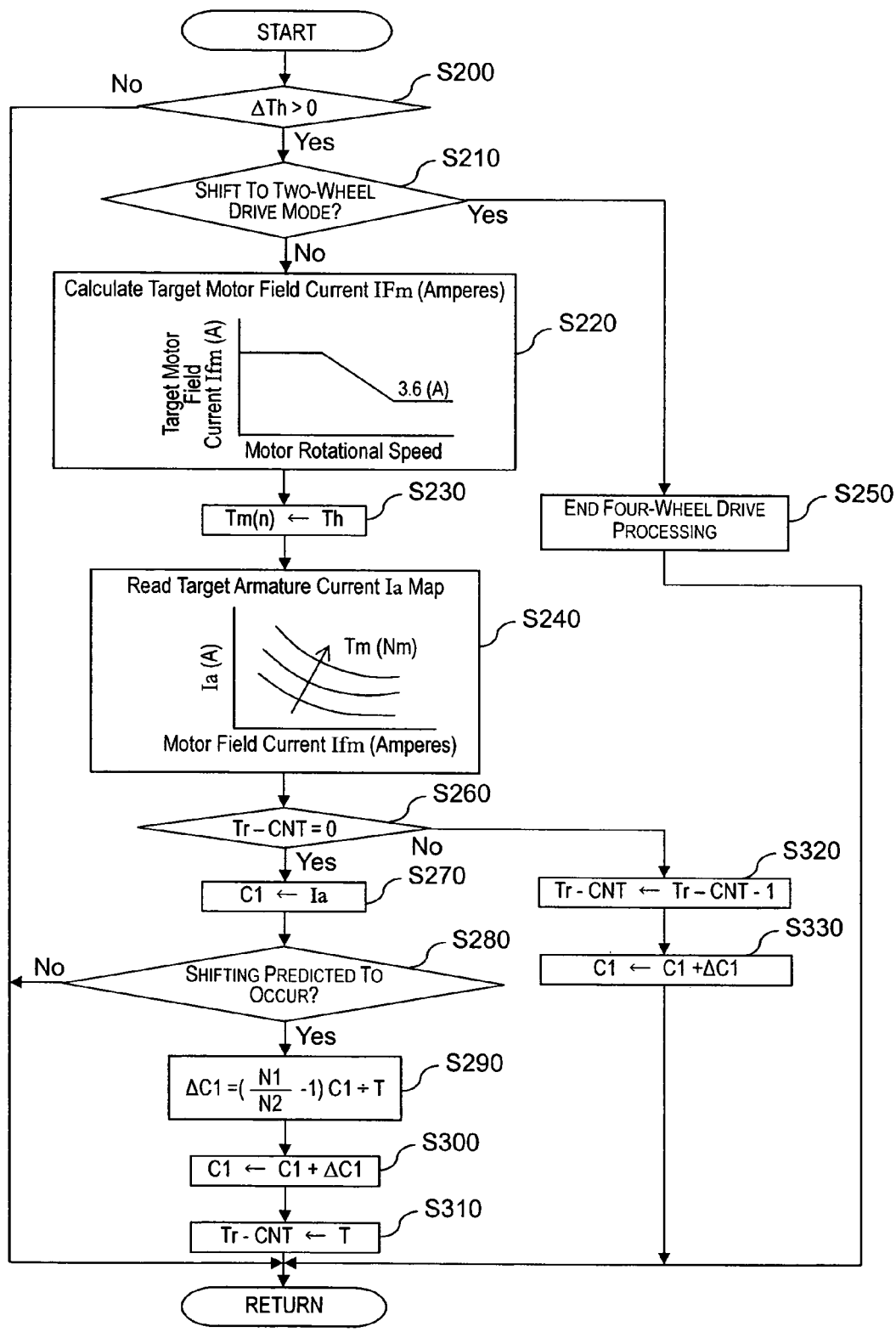
FIG. 6 is a flow chart illustrating the processing sequence executed by a surplus torque converting section or unit for the vehicle driving force control apparatus in accordance with the first embodiment of the present invention.

The processing sequence executed by the surplus torque converting unit 8G will now be described with reference to FIG. 6.

In step S200, the surplus torque converting unit 8G determines of the target generator load torque Th is larger than 0. If Th is larger than 0, then the surplus torque converting unit 8G determines that acceleration slippage is occurring at the front wheels 1L and 1R and proceeds to step S210. If Th is equal to or less than 0, then the surplus torque converting unit determines that the front wheels 1L and 1R are not undergoing acceleration slippage and returns to the beginning of the control sequence leaving the vehicle in a two-wheel drive mode.

In step S210, the surplus torque converting unit 8G determines of the vehicle will shift from four-wheel drive mode to two-wheel drive mode. If it determines that the vehicle will shift to two-wheel drive, it proceeds to step S250 where it executes such four-wheel drive termination processing as releasing the clutch and stopping the electric generator (c1=0) before returning to the beginning of the control sequence.

The surplus torque converting unit 8G determines that the vehicle will shift to two-wheel drive in such cases as when the rotational speed of the electric motor 4 has approached an allowable rotational speed limit or when the target motor torque is on a decreasing trend and is found to have become equal to or less than a prescribed threshold value T−TM1 (e.g., 1 N−m).

In step S220, the surplus torque converting unit 8G reads in the rotational speed Nm of the electric motor 4 detected by the motor rotational speed sensor 21 and calculates the target motor field current Ifm based on the rotational speed Nm of the electric motor 4. Then it sends the calculated target motor field current Ifm to the motor control unit 8C before proceeding to step S230.

The target motor field current Ifm is held at a fixed current value with respect to the rotational speed Nm of the electric motor 4 so long as the rotational speed Nm is less than a prescribed rotational speed. When the rotational speed Nm exceeds the prescribed rotational speed, the field current Ifm of the electric motor 4 is reduced using a well-known weak field control method. More specifically, when the rotational speed of the electric motor 4 becomes high, the motor induced voltage E increases and the motor torque declines. Thus, when the rotational speed Nm of the electric motor 4 exceeds a prescribed value, the field current Ifm of the electric motor 4 is reduced in order to reduce the induced voltage E and thereby increase the current flowing to the motor 4 in order to obtained the required torque. As a result, even if the rotational speed of the electric motor 4 becomes high, the required torque can be obtained because the induced voltage E is kept from increasing so that the motor torque is kept from declining. Since the motor field current Ifm is controlled in two stages, i.e., one field current is used for rotational speeds below a prescribed rotational speed and another field current is used for rotational speeds equal to or above a prescribed rotational speed, the electronic circuitry can be make less expensive than in a case where the field current is controlled on a continuous basis.

It is also acceptable to provide a motor torque correcting unit that corrects the motor torque on a continuous basis by adjusting the field current Ifm in accordance with the rotational speed Nm of the electric motor 4. In other words, it is acceptable to adjust the field current Ifm of the electric motor 4 on a continuous basis in accordance with the motor rotational speed Nm instead of on a two-stage basis. Here again, even if the rotational speed of the electric motor 4 becomes high, the required torque can be obtained because the induced voltage E of the electric motor 4 is kept from increasing so that the motor torque is kept from declining. This approach provides a smooth motor torque characteristic and thereby enables the vehicle to travel in a more stable manner than in the case of two-stage control and enables the motor to be driven in an efficient state at all times.

In step S230, the surplus torque converting unit 8G calculates the target motor torque Tm (n) corresponding to the generator load torque Th calculated by the surplus torque computing unit 8E using a map or the like and proceeds to step S240.

The step S240, surplus torque converting unit 8G calculates the target armature current Ia corresponding to the target motor torque Tm (n) and the target motor field current Ifm using a map or the like and proceeds to step S260.

In step S260, the surplus torque converting unit 8G determines if the value of the transmission gear-shift counter Tr-cnt is 0, i.e., if the command value at the electric generator 7 is in the process of being adjusted. If the counter value is 0 (i.e., the command value is not being adjusted), the surplus torque converting unit 8G proceeds to step S270. If the counter value is not 0 (i.e., the command value is being adjusted), the surplus torque converting unit 8G proceeds to step S320.

In step S270, the surplus torque converting unit 8G computes the duty ratio c1 (i.e., the generator control value) required to achieve the target motor voltage based on the target armature current Ia and proceeds to step S280.

In step S280, the surplus torque converting unit 8G predicts if the transmission 30 will shift and, if so, proceeds to step S290. If not, the surplus torque converting unit 8G returns to the beginning of the control sequence.

Figure 7:
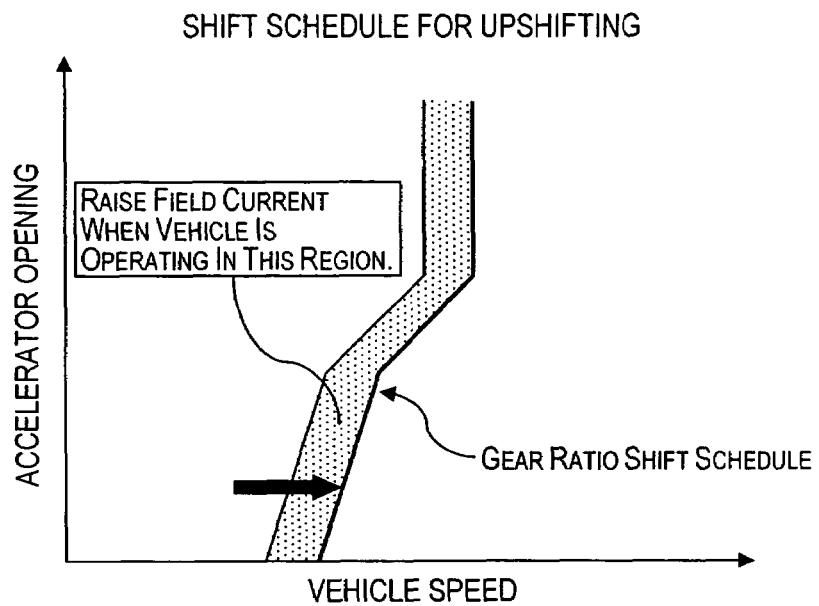
FIG. 7 is a graph illustrating the control executed during upshifting of the transmission by the vehicle driving force control apparatus in accordance with the first embodiment of the present invention.
Figure 8:
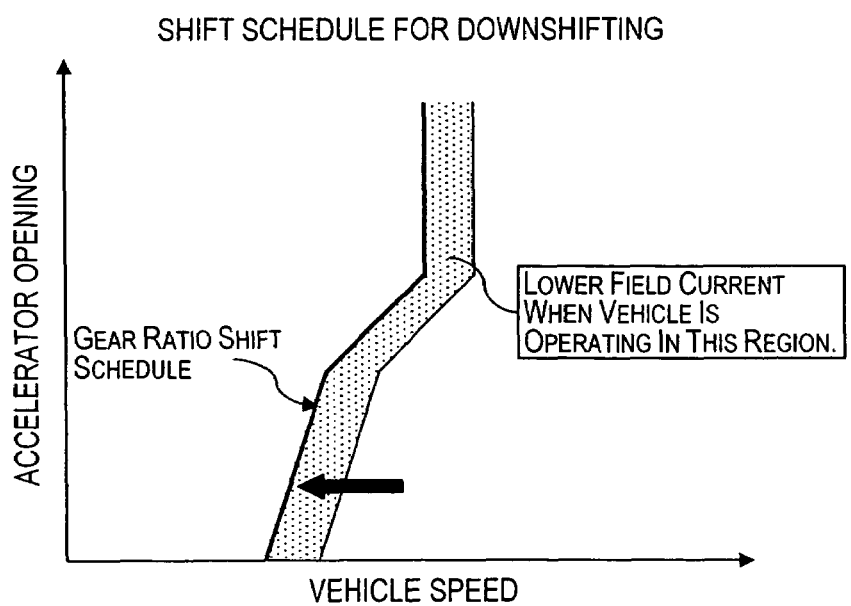
FIG. 8 is a graph illustrating the control executed during downshifting of the transmission by the vehicle driving force control apparatus in accordance with the first embodiment of the present invention.

The prediction is accomplished, for example, as follows. Upshifting is predicted when the accelerator position and the vehicle speed are in the vicinity of the shift point (i.e., in the shaded portion) as shown in FIG. 7 and the vehicle speed is increasing (i.e., the vehicle is accelerating). Downshifting is predicted when the accelerator position and the vehicle speed are in the vicinity of the shift point (i.e., in the shaded portion) as shown in FIG. 8 and the vehicle speed is decreasing (i.e., the vehicle is being braked). Alternatively, in step S280, the surplus torque converting unit 8G detects if a mechanical execution of gear shifting by the transmission 30, an issuance or occurrence of an electronic instruction, computer command, or other indication has occurred that indicates the transmission 30 will commence gear shifting.

In step S290, the surplus torque converting unit 8G calculates the incremental adjustment amount $\Delta c1$ of the duty ratio c1 (generator control command value) using the equation shown below and proceeds to step S300.

$$\Delta c1 = [(N1/N2) - 1] \times c1/T$$

where N1: transmission gear ratio N1 before shifting,
N2: transmission gear ratio N2 after shifting, and
T: time from prediction of shifting until execution of shifting.

More specifically, when the transmission 30 shifts to a different gear ratio, the rotational speed of the engine changes according to the new gear ratio. In order to suppress the change in the generator output voltage resulting from the change in engine rotational speed, the current duty ratio c1 should be multiplied by N1/N2 in order to obtain the duty ratio c1 corresponding to the field current required after the gear ratio is changed. In this embodiment, in order to change the duty ratio gradually toward the post-shift duty ratio during the period leading up to the actual upshift or downshift by the transmission 30, the difference between the current duty ratio and the post-shift duty ratio is divided by the time lag (the amount of time from when shifting is predicted until shifting is executed) to obtain an incremental adjustment amount $\Delta c1$. The field current has a first degree delay component.

The incremental adjustment amount $\Delta c1$ is a positive value when the transmission 30 will upshift and a negative value when the transmission 30 will downshift.

In step S300 the incremental adjustment amount $\Delta c1$ is added to the duty ratio c1, and in step S310, the time value T is substituted as the value of the transmission gear-shift counter Tr-cnt before ending the control sequence. The default value of the transmission gear-shift counter Tr-cnt is 0.

If it is determined in step S260 that the transmission 30 is in the process of shifting to a different gear ratio, the surplus torque converting unit 8G proceeds to step S320 where it decrements the transmission gear-shift counter Tr-cnt. In step S330, the surplus torque converting unit 8G adds the incremental adjustment amount $\Delta c1$ to the duty ratio c1 and ends the control sequence.

In this explanation, steps S260 and S280 to S330 serve to gradually adjust the duty ratio c1 toward the duty ratio corresponding to the field current that will be required after the predicted gear shifting of the transmission 30 occurs. It is also acceptable to convert the duty ratio c1 that is constantly calculated in step S270 to the value obtained by multiplying the same by the ratio N1/N2 when the transmission 30 is determined to be in the process of changing gear ratios in step S280 (i.e., when the accelerator position and vehicle speed are in the shaded region of FIG. 7 or 8 and are changing toward the shift point (indicated with bold line)). In such a case, steps S260 and S300 to S330 can be omitted.

The processing executed by the engine controller 18 will now be described.

Figure 9:
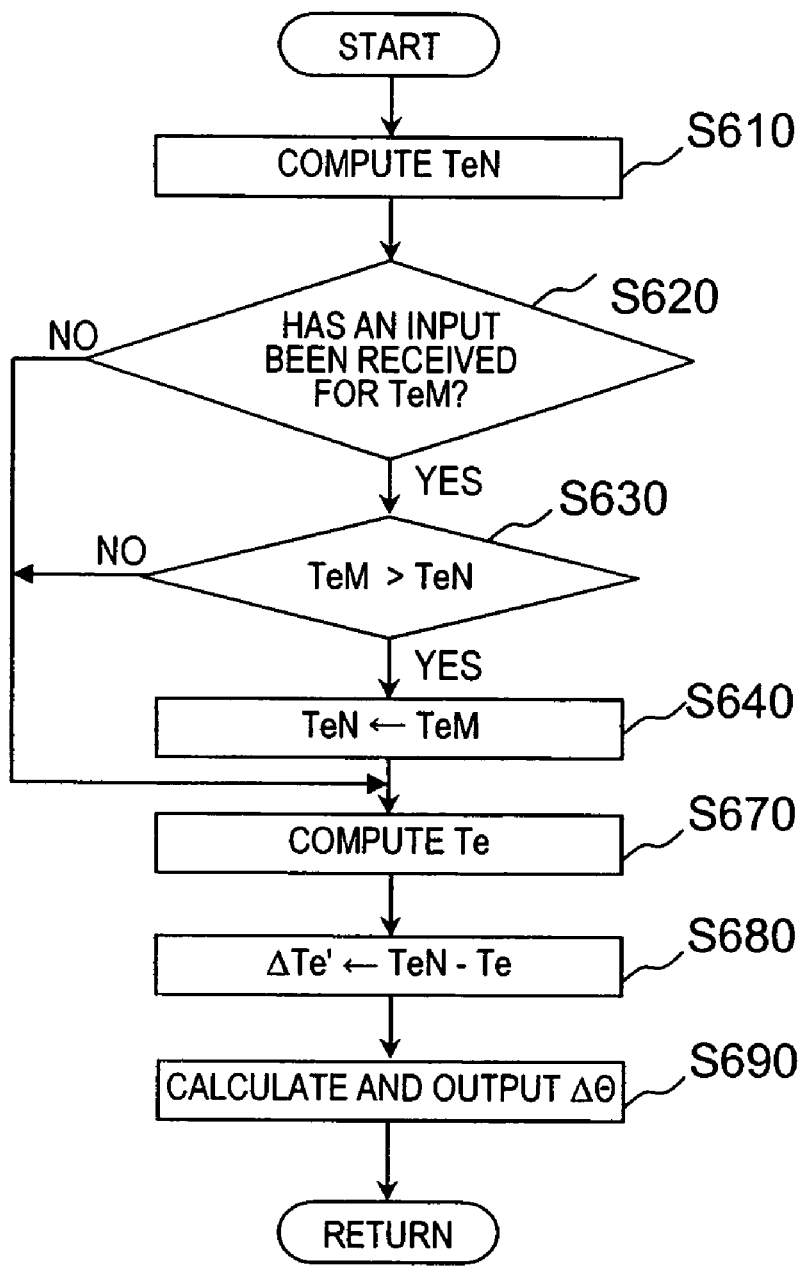
FIG. 9 is a flowchart showing the processing sequence executed by an engine controller for the vehicle driving force control apparatus in accordance with the first embodiment of the present invention.

The engine controller 18 executes the processing shown in FIG. 9 based on the various input signals in accordance with a prescribed sampling time (i.e., once every per sampling time period).

In step S610, the engine controller 18 computes the target output torque TeN requested by the driver based on the detection signal received from the accelerator sensor 40 and proceeds to step S620.

In step S620, the engine controller 18 determines if the engine output torque limit TeM is being received from the 4WD controller 8. If so, the engine controller 18 proceeds to step S630. If not, the engine controller proceeds to step S670.

In step S630, the engine controller 18 determines of the engine output torque limit TeM is smaller than the target output torque TeN. If the engine output torque limit TeM is smaller, the engine controller 18 proceeds to step S640. Meanwhile, if the engine output torque limit TeM is equal to or larger than the target output torque TeN, the engine controller 18 proceeds to step S670.

In step S640, the engine controller 18 limits the target output torque TeN by substituting the engine output torque limit TeM for the target output torque TeN and proceeds to step S670.

In step S670, the engine controller 18 calculates the current output torque Te based on the throttle opening, engine rotational speed, etc., and proceeds to step S680.

In step S680, the engine controller 18 finds the difference $\Delta Te'$ between the current output torque and the target output torque TeN using the equation shown below and proceeds to step S690.

$$\Delta Te' = TeN - Te$$

In step S690, the engine controller 18 calculates the adjustment amount $\Delta\theta$ of the throttle opening $\theta$ corresponding to the difference $\Delta Te'$ and sends a throttle opening signal corresponding to the throttle opening adjustment amount $\Delta\theta$ to the stepper motor 19 before returning to the beginning of the control sequence.

The steps S620 to S640 constitute a main drive source output adjusting section.

The effects of the device described heretofore will now be described.

When the torque transmitted to the front wheels 1L and 1R from the engine 2 exceeds the road surface reaction force torque limit, i.e., when the front wheels 1L and 1R (main drive wheels 1L and 1R) undergo acceleration slippage, due to the coefficient of friction μ of the road surface being small or the accelerator pedal 17 being depressed deeply by the driver, the clutch 12 is connected and the electric generator 7 is operated with a load torque Th corresponding to the magnitude of the acceleration slippage, thus shifting the vehicle into four-wheel drive mode. Then, when the drive torque transmitted to the front wheels 1L and 1R is adjusted so as to approach a value close to the road surface reaction torque limit of the front wheels 1L and 1R, the vehicle is shifted back to two-wheel drive. As a result, acceleration slippage of the front wheels 1L and 1R (main drive wheels) is suppressed.

Furthermore, the acceleration performance of the vehicle is improved by using the surplus electric power generated by the electric generator 7 to drive the electric motor 4 and, thereby, to drive the rear wheels 3L and 3R (subordinate drive wheels).

Additionally, the energy efficiency is increased and the fuel consumption improved because the electric motor 4 is driven using surplus torque in excess of the road surface reaction force torque limit of the main drive wheels 1L and 1R.

If the rear wheels 3L and 3R are always driven, several energy conversions will take place (from mechanical energy to electrical energy and again from electrical energy to mechanical energy), creating energy losses corresponding to the conversion efficiencies. As a result, the acceleration performance of the vehicle will decline in comparison with a case in which only the front wheels 1L and 1R are driven. Thus, it is generally preferable to avoid driving of the rear wheels 3L and 3R. Conversely, this embodiment takes into consideration the fact that when traveling on a slippery road surface or the like, even if all the output torque Te of the internal combustion engine 2 is transferred to the front wheels 1L and 1R, not all of the torque will be used as driving force. The driving force that cannot be utilized efficiently by the front wheels 1L and 1R is outputted to the rear wheels 3L and 3R and the acceleration performance is improved.

Figure 10:
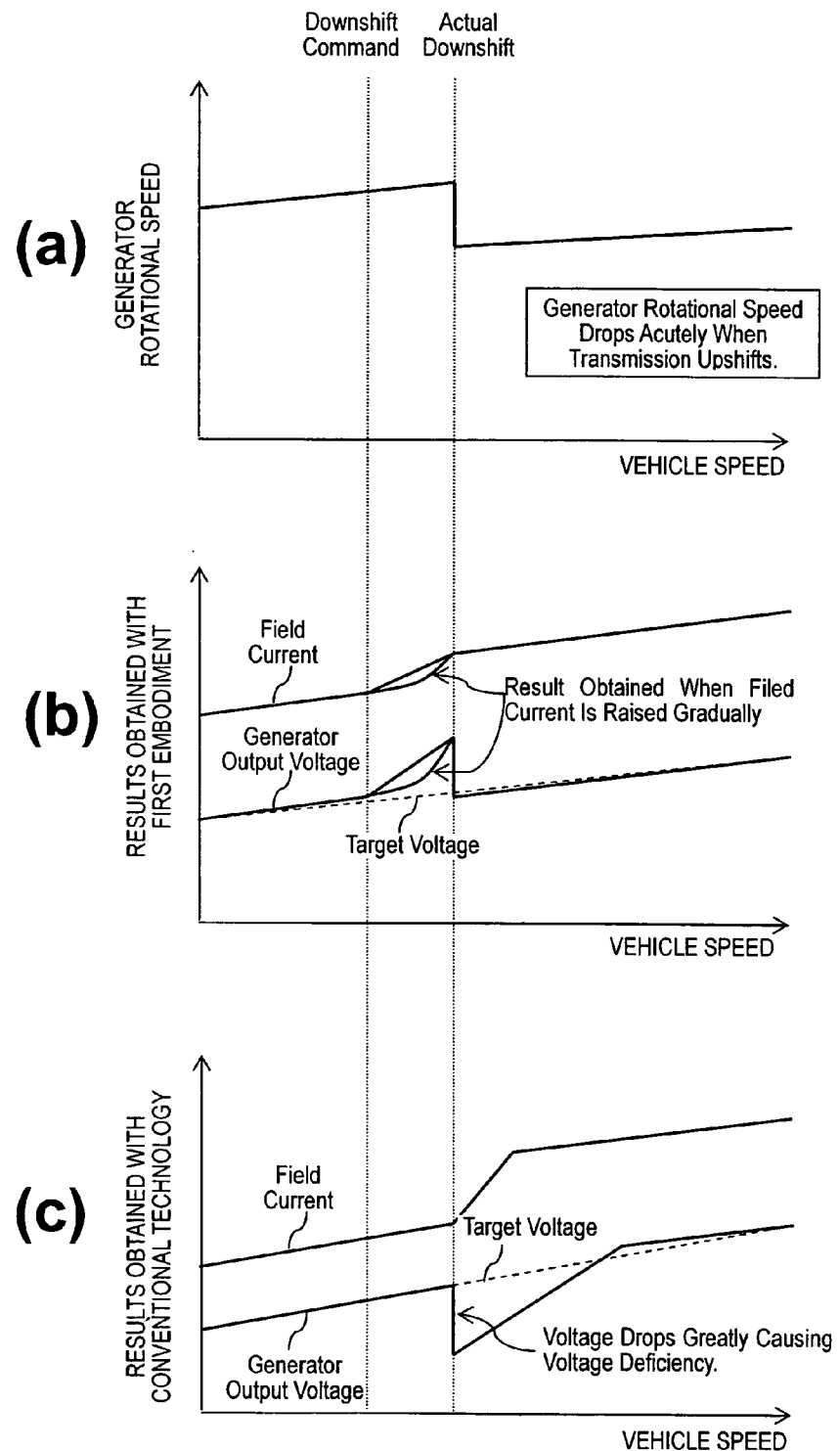
FIG. 10 are time charts for upshifting the transmission when using the vehicle driving force control apparatus in accordance with the first embodiment of the present invention.

If the transmission 30 upshifts while the vehicle is in the aforementioned four-wheel drive mode, the engine rotational speed will decrease acutely and the rotational speed of the electric generator 7 will fall acutely as shown in time chart (a) of FIG. 10. If the field current of the generator 7 is feedback controlled in order to secure the target output voltage after the acute decrease in the rotational speed of the electric generator 7, the actual output voltage will undergo a large temporary voltage drop as shown in time chart (c) of FIG. 10. In short, since the voltage required by the motor 4 cannot be supplied for a temporary period, there is the possibility that the motor torque will temporarily become insufficient and, during said temporary period, it will not be possible to maintain the acceleration of the vehicle.

Conversely, with this embodiment, before the transmission 30 upshifts, the upshift is predicted and the field current of the electric generator 7 is increased toward the field current value that will be required based on the rotational speed of the electric generator after the upshift. As a result, as shown in time chart (b) of FIG. 10, even if the rotational speed of the electric generator decreases acutely during the upshift, the occurrence of a large drop in the generator output voltage can be prevented, the target motor torque can be obtained reliably, and the desired vehicle acceleration performance can be delivered.

As shown in time chart (b) of FIG. 10, the output voltage becomes temporarily excessive in the period leading up to the upshift, but the amount of the excess voltage can be adjusted by designing the control processing such that the withstand voltages of the circuit components are not exceeded and the circuit components are not damaged. In particular, since the voltage can be increased gradually by increasing the field current gradually, the occurrence of a voltage surge can be prevented. It is also acceptable to increase the field current using a target field current value that is lower than the field current value corresponding to the rotational speed that will exist after the transmission 30 upshifts.

Figure 11:
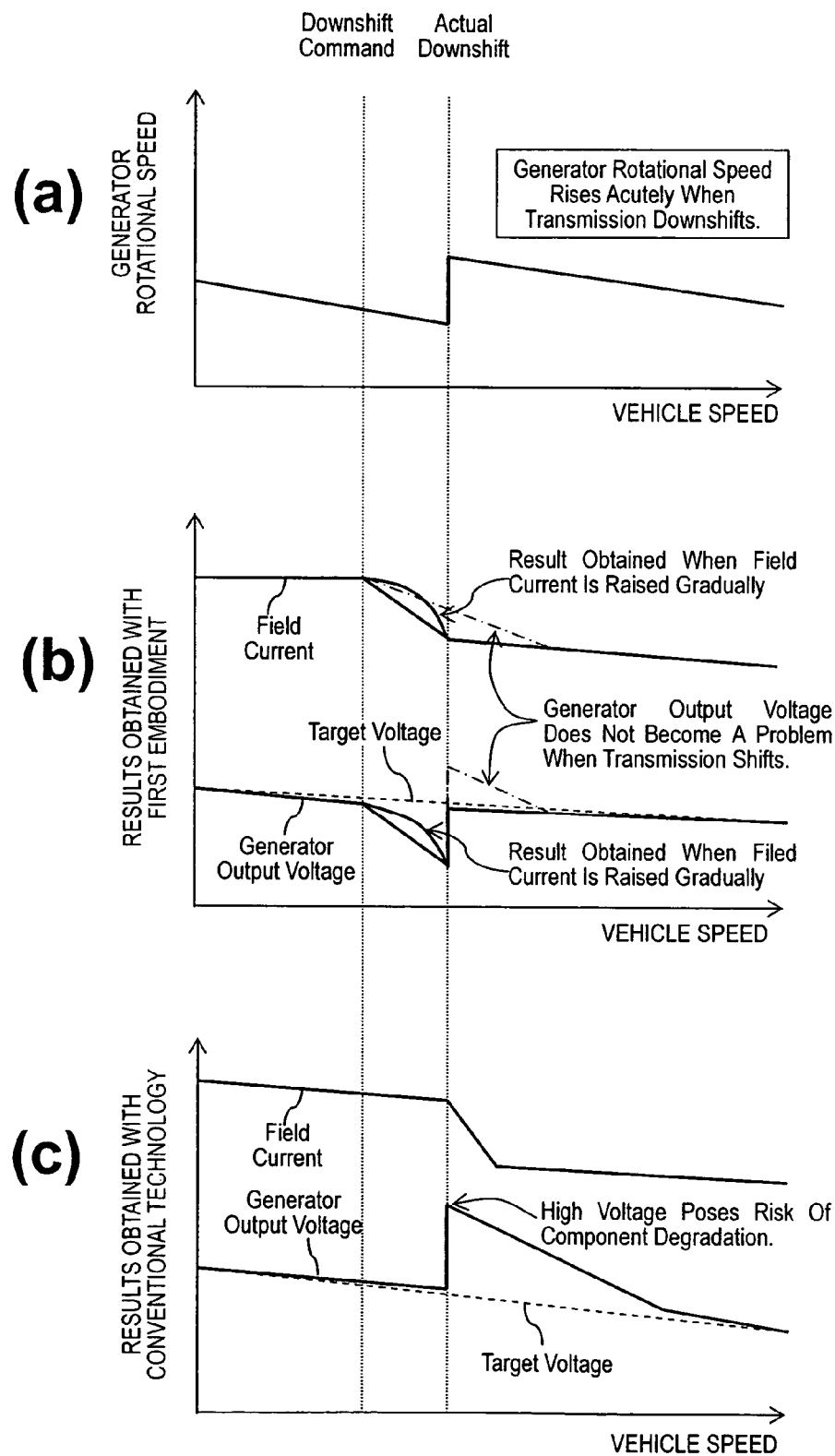
FIG. 11 are time charts for downshifting the transmission when using the vehicle driving force control apparatus in accordance with the first embodiment of the present invention.

Meanwhile, if the transmission 30 downshifts while the vehicle is in the aforementioned four-wheel drive mode, the engine rotational speed will increase acutely and the rotational speed of the electric generator 7 will rise acutely as shown in time chart (a) of FIG. 11. If the field current of the generator is feedback controlled in order to secure the target output voltage after the acute increase in the rotational speed of the electric generator, the actual output voltage will undergo a large temporary voltage rise as shown time chart (c) of FIG. 11. Thus, there is a need for high voltage measures to be taken to prevent the occurrence of voltages exceeding the withstand voltages of the circuit components.

Conversely, with this embodiment, before the transmission 30 downshifts, the downshift is predicted and the field current of the electric generator 7 is decreased toward the field current value that will be required based on the rotational speed of the electric generator 7 after the downshift. As a result, as shown in time chart (b) of FIG. 11, even if the rotational speed of the electric generator 7 increases acutely during the downshift, the occurrence of a large increase in the generator output voltage can be prevented and it will not necessarily be required for high voltage measures to be taken to prevent the electric generator from delivering an excessive output voltage.

As shown in time chart (b) of FIG. 11, the output voltage decreases temporarily during the period leading up to the downshift, but the amount of the voltage decrease can be adjusted by designing the control processing such that the drop in motor torque is held to a small amount. It is also acceptable to decrease the field current using a target field current value that is higher than the field current value corresponding to the rotational speed that will exist after the transmission 30 downshifts.

In the first embodiment described heretofore, the duty ratio corresponding to the field current of the electric generator 7 that will be required after the transmission 30 changes gear ratios is predicted by estimating the engine rotational speed that will exist after the transmission 30 changes gear ratios based on the gear ratios from which and to which the transmission 30 is shifting (i.e., the two gear ratios between which the transmission 30 is shifting). However, the present invention is not limited to such an arrangement. For example, it is also acceptable to prepare a map like that shown in Table 1 below that plots the field current and target generator output voltage versus the rotational speed. Then, by finding the rotational speed that will exist after the transmission 30 shifts gear ratios based on the gear ratio to which the transmission 30 will shift (i.e., the gear ratio that will be in use after the upshift or downshift), the target field current can be found using the map (Table 1) based on the target output current and the rotational speed estimated to exist after the transmission 30 upshifts or downshifts.

TABLE 1

| Generator Output Current | Generator Rotational Speed Field current | | |
|---|---|---|---|
| | 2000 rpm | 3000 rpm | 4000 rpm |
| 15 | 0.60 | 0.45 | 0.31 |
| 20 | 0.80 | 0.6 | 0.41 |
| 25 | 1.00 | 0.74 | 0.52 |
| 30 | 1.40 | 1.10 | 0.75 |
| 35 | 1.80 | 1.35 | 0.90 |
| 40 | 2.40 | 1.80 | 1.25 |
| 45 | 3.40 | 2.70 | 1.80 |
| 50 | 5.00 | 3.70 | 2.50 |

Although the first embodiment presents an example of a case in which the field current of the electric generator is increased or decreased in advance when the vehicle approaches a transmission gear shift point based on the shift schedule, the present invention is not limited to such an approach. For example, it is also acceptable to control the transmission 30 such that it executes the actual gear shift operation when a prescribed time lag T has elapsed after receiving a shift command or to configure the transmission control unit 33 such that it issues the actual shift command to the transmission 30 when a prescribed time lag T has elapsed after detecting a shift point based on a time schedule. It is also acceptable to design step S280 of the surplus torque converting unit 8G such step S290 is executed when a shift point is detected based on a time schedule.

Although the first embodiment describes a case in which the voltage generated by the electric generator 7 is used to drive an electric motor 4 and thereby execute four-wheel drive, the present invention is not limited to such an arrangement. It is also acceptable to use a drive system provided with a battery configured and arranged such that it can supply electric power to the electric motor 4. In such a case, the electric power can be supplied to the electric motor 4 from the battery or from both the battery and the electric generator 7 simultaneously.

Although the first embodiment describes a case in which the main drive source is an internal combustion engine, it is also acceptable to use an electric motor or other device as the main drive source. Also, although the first embodiment describes a case in which the vehicle is a four-wheel drive vehicle, it is also acceptable for the vehicle to be a two-wheel drive vehicle using an electric motor as the main drive source.

Although the system of the first embodiment shifts to four-wheel drive when the front wheels undergo acceleration slippage, it is also acceptable to apply the invention to a system that shifts to four-wheel drive when the vehicle is starting to move from a stopped condition or when the accelerator pedal is depressed beyond a prescribed position.

Although in the first embodiment acute changes in the rotational speed of the engine are predicted based on the gear ratio of the transmission 30 and the field current of the electric generator is adjusted (increased or decreased) accordingly before the transmission 30 actually shifts to a different gear ratio, it is also acceptable for acute changes in the rotational speed of the engine to be predicted using a different means.

Although in the first embodiment the amount by which the field current of the electric generator is increased or decreased in anticipation of the rotational speed of the engine undergoing an acute change is calculated based on the gear ratio, it is also acceptable to calculate the amount by which the field current of the electric generator will be increased or decreased based on some other factor. It is also acceptable to use a fixed value for the increase/decrease amount.

Second Embodiment

Referring now to FIGS. 12 to 17, a vehicle drive force control apparatus in accordance with a second embodiment will now be explained. The configuration of the vehicle used in this second embodiment is the same as the configuration of the vehicle in the first embodiment (see FIG. 1). In view of the similarity between the first and second embodiments, the parts or steps of the second embodiment that are identical to the parts or steps of the first embodiment will be given the same reference numerals as the parts of the first embodiment. Moreover, the descriptions of the parts or steps of the second embodiment that are identical to the parts or steps of the first embodiment may be omitted for the sake of brevity. In other words, unless otherwise specified, the rest of the configuration of the vehicle and the processing of the vehicle drive force control apparatus in the second embodiment is the same as the configuration of the first embodiment.

The basic constituent features of the second embodiment are the same as those of the first embodiment. However, the surplus torque converting unit 8G is configured to change the field current of the electric motor 4 in accordance with the gear ratio of the transmission 30 instead of changing the field current of the electric generator 7.

Figure 12:
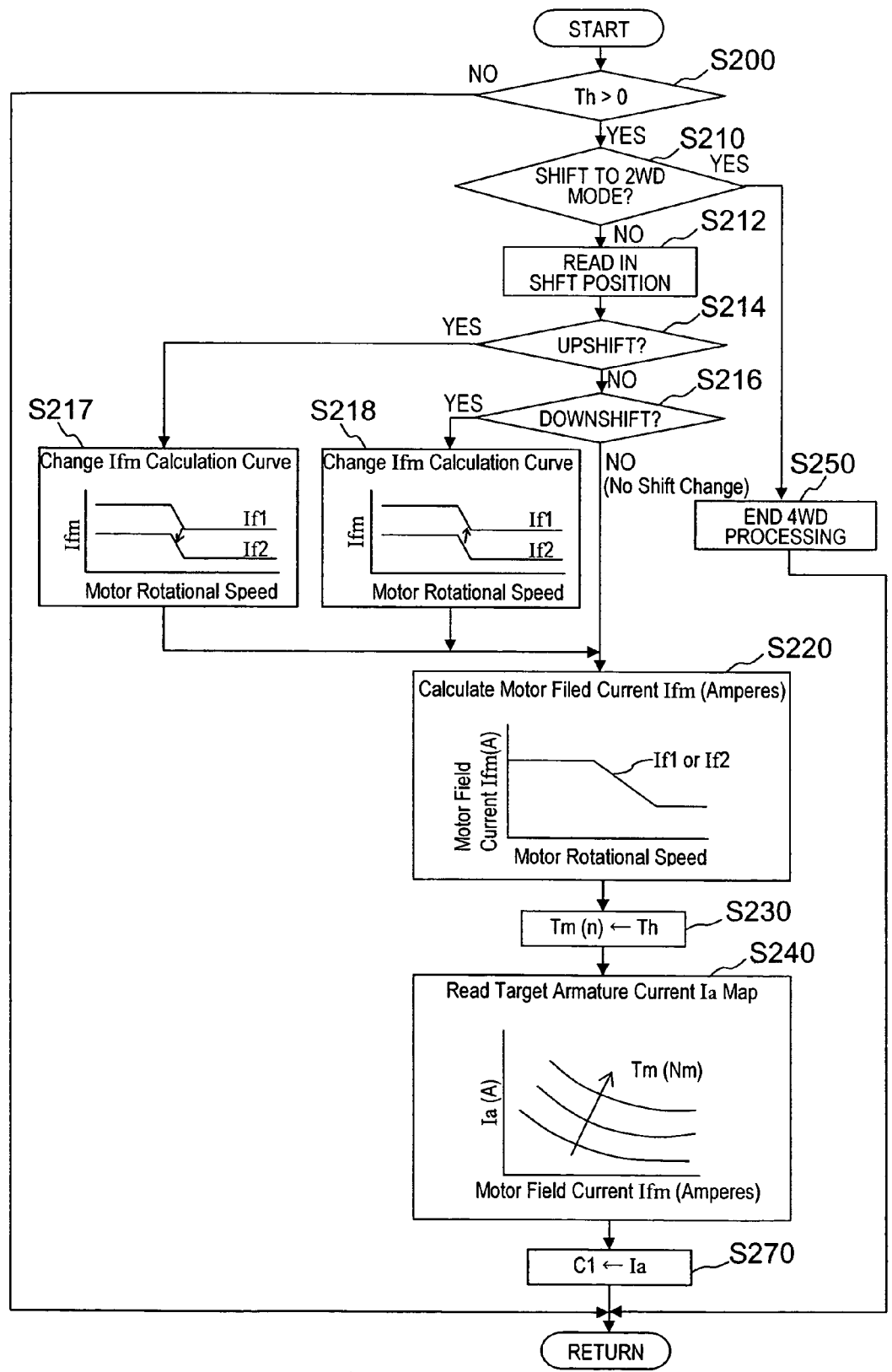
FIG. 12 is a flowchart showing the processing executed by a surplus torque converting section or unit for the vehicle driving force control apparatus illustrated in FIG. 1 in accordance with a second embodiment of the present invention.

Also, in the second embodiment, the surplus torque converting unit 8G is configured to execute the processing shown in FIG. 12. Separate tables plotting the motor field current versus the motor rotational speed are provided for each transmission gear ratio (this embodiment illustrates a case in which there are tables for first speed and second speed) and the motor field current table used is selected in accordance with the current gear ratio of the transmission 30. The field current value for a given motor rotational speed is set higher in the first speed table than in the second speed table.

In step S210, the surplus torque converting unit 8G determines of the vehicle is in four-wheel drive mode. If so, it proceeds to step S212 where acquires the current gear ratio (shift position) of the transmission 30 and proceeds to step S214.

In step S214, the surplus torque converting unit 8G determines if the current gear ratio is higher than the gear ratio acquired when the torque command was calculated in the previous control cycle. In this embodiment, this means determining or predicting if the transmission 30 has upshifted from first speed to second speed. If the transmission 30 has upshifted, the surplus torque converting unit 8G proceeds to step S217 where it changes the table plotting the motor field current versus the motor rotational speed to the table designed for second speed. Then it proceeds to step S220.

If it determines in step S214 that the transmission 30 has not upshifted since the previous control cycle, the surplus torque converting unit 8G proceeds to step S216 where it determines if the current gear ratio is lower than the gear ratio acquired when the torque command was calculated in the previous control cycle. In this embodiment, this means determining or predicting if the transmission 30 has downshifted from second speed to first speed. If the transmission 30 has downshifted, the surplus torque converting unit 8G proceeds to step S218 where it changes the table plotting the motor field current versus the motor rotational speed to the table designed for first speed. Then it proceeds to step S220. Meanwhile, if the surplus torque converting unit 8G finds that the gear ratio has not changed since the previous control cycle, it proceeds to step S220 without changing the table.

In step S220, the surplus torque converting unit 8G uses the currently selected table plotting the motor field current versus the motor rotational speed to find the target motor field current Ifm corresponding to the rotational speed Nm of the electric motor 4 detected by the motor rotational speed sensor 21. The surplus torque converting unit 8G then sends the target motor field current Ifm to the motor control unit 8C before proceeding to step S230.

In step S230, the surplus torque converting unit 8G uses a map or the like to find the target motor torque Tm (n) based on the generator load torque Th calculated by the surplus torque computing unit 8E and proceeds to step S240.

In step S240, the surplus torque converting unit 8G uses a map or the like to find the target armature current Ia based on the target motor torque Tm (n) and the target motor field current Ifm and proceeds to step S270.

In step S270, the surplus torque converting unit 8G computes the duty ratio c1, i.e., the generator control command value for obtaining the target motor voltage, based on the target armature current Ia and outputs the target armature value before returning to the beginning of the control sequence.

The operation and effects of the second embodiment will now be explained.

With this embodiment, when the transmission 30 shifts to a different gear ratio and it is estimated that the rotational speed of the engine 2 will change acutely, the motor field current table corresponding to the new gear ratio is selected for use by the surplus torque converting unit 8G. As a result, the motor field current is reduced when the transmission 30 upshifts and increased when the transmission 30 downshifts.

For example, if the engine rotational speed declines acutely due to the transmission 30 shifting up to a higher gear ratio, thereby causing the rotational speed and the output voltage of the electric generator 7 to suddenly decrease in an acute manner, the induced voltage of the electric motor 4 can be reduced by reducing the field current of the electric motor 4 and, as a result, a large decrease in the motor torque can be prevented or alleviated. Conversely, if the engine rotational speed rises sharply due to the transmission 30 shifting down to a lower gear ratio, thereby causing the rotational speed and the output voltage of the electric generator 7 to suddenly rise in an acute manner, the induced voltage of the electric motor 4 can be increased by increasing the field current of the electric motor 4 and, as a result, a large increase in the motor torque can be prevented or alleviated.

Specifically, the induced voltage E of the electric motor 4 is proportional to the rotational speed and the field magnetic flux of the electric motor 4, and the voltage V supplied from the electric generator 7 and the induced voltage E have the following relationship: $V = R \cdot Ia + E$. In short, the larger the difference between the supplied voltage V and the induced voltage E is, the larger the armature current Ia and, thus, the motor torque become. Since the rotational speed of the electric motor 4 is proportional to the vehicle speed, the induced voltage increases as the vehicle speed increases and decreases as the vehicle speed decreases.

Figure 13:
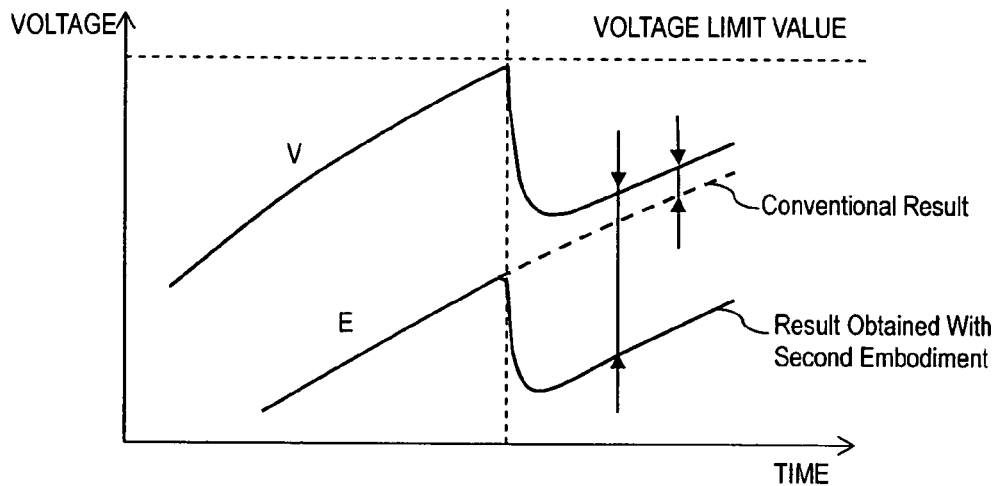
FIG. 13 is a sample time chart for upshifting the transmission when using the vehicle driving force control apparatus in accordance with the second embodiment.

As shown in FIG. 13, when the vehicle speed is increasing with time, the transmission 30 upshifts in accordance with a shift schedule such that it upshifts at a particular vehicle speed determined based on the particular acceleration specification. When the transmission 30 upshifts, the engine rotational speed declines and the supply voltage (output voltage) V declines. The induced voltage E of the electric motor continues to increase proportionally to the vehicle speed after the upshift and the potential difference between the supply voltage V and the induced voltage E decreases. If this trend is allowed to continue unchecked, there is the possibility that the motor torque will decline and become insufficient.

With the second embodiment, however, the field current (i.e., the field magnetic flux) of the electric motor 4 is reduced when the upshift of the transmission 30 is detected and the induced voltage E is decreased. As a result, the potential difference between the supply voltage V and the induced voltage E is secured and the motor torque is prevented from declining, thereby avoiding the occurrence of a motor torque deficiency.

Figure 14:
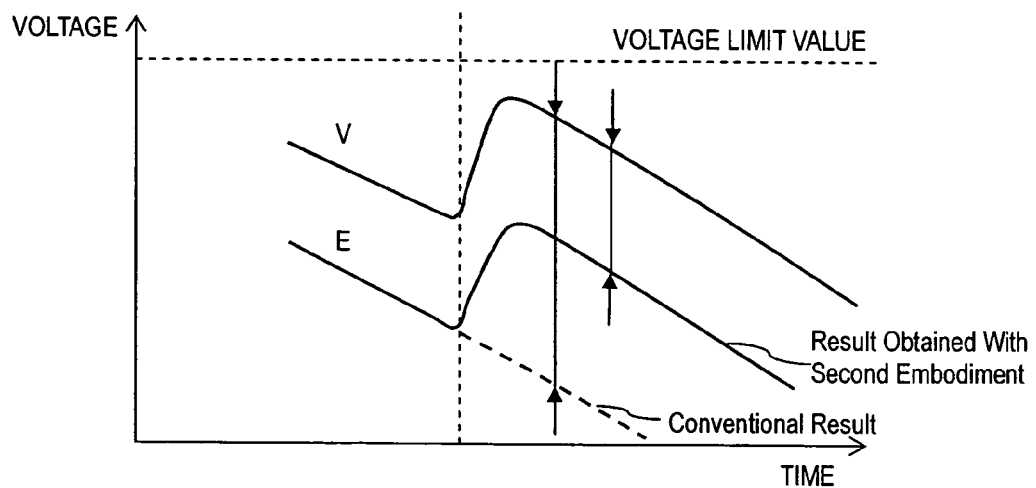
FIG. 14 is an example time chart for downshifting of the transmission when using the vehicle driving force control apparatus in accordance with the second embodiment.

Meanwhile, as shown in FIG. 14, when the vehicle speed is decreasing with time, the transmission 30 downshifts in accordance with a shift schedule such that it downshifts at a particular vehicle speed determined based on the particular acceleration specification. When the transmission 30 downshifts, the engine rotational speed rises and the supply voltage (output voltage) V rises. The induced voltage E of the electric motor 4 continues to decrease proportionally to the vehicle speed after the downshift and the potential difference between the supply voltage V and the induced voltage E increases. If this trend is allowed to continue unchecked, there is the possibility that the motor torque will become excessive and the rear wheels (which are the subordinate drive wheels) will be put into a rapid acceleration state.

With the second embodiment, however, the field current of the electric motor 4 is increased when the downshift of the transmission 30 is detected and the induced voltage E is increased. As a result, the potential difference between the supply voltage V and the induced voltage E prevented from increasing and the motor torque is held at an appropriate level.

All other constituent features and operational effects are substantially the same as those of the first embodiment.

Figure 15:
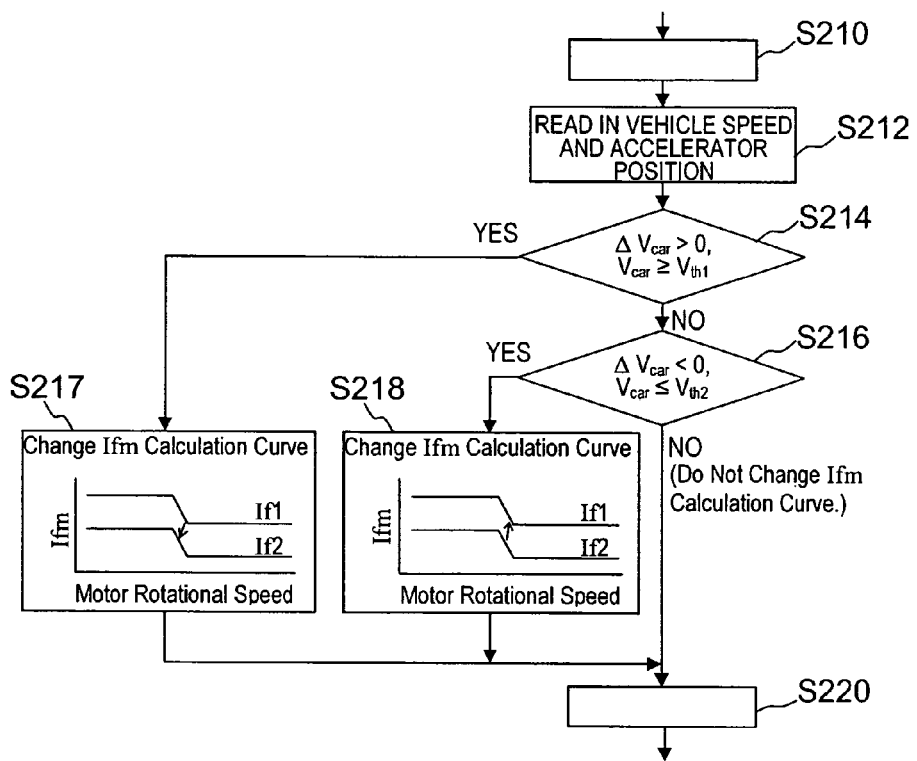
FIG. 15 is a flowchart illustrating the processing executed by an alternative surplus torque converting unit in accordance with the second embodiment of the present invention.
Figure 16:
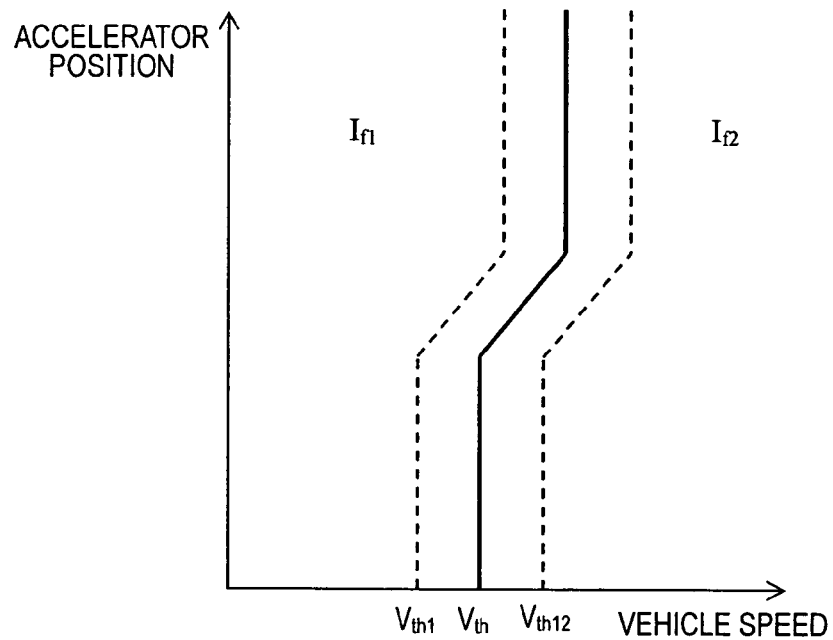
FIG. 16 is a simplified diagram of a shift schedule for the vehicle driving force control apparatus in accordance with the second embodiment of the present invention.

Although the second embodiment describes a case in which the motor field current is changed in advance of the acute change in the engine rotational speed by changing the magnitude of the motor field current in synchronization with the shifting of the transmission 30, the present invention is not limited to such an approach. It is also acceptable to change (select) the field current table used in accordance with predictions of transmission 30 shifting based on a shift schedule. For example, steps S212 to S216 of the surplus torque converting unit 8G can be changed as shown in FIG. 15. In this alternative example, the surplus torque converting unit 8G reads in the vehicle speed and accelerator position in step S212. The shift point Vth between first speed and second speed is defined as shown in FIG. 16 and the prediction region is established on both sides of the shift point Vth. In FIG. 16 the shift point for shifting from first speed to second speed is the same as the shift point for shifting from second speed to first speed in order to simplify the diagram, but it is also acceptable to employ a prescribed degree of ??hysteresis.

In step S214, if the vehicle speed is increasing and the vehicle speed is larger than the threshold value Vth1, which is slightly smaller than the shift point Vth, the surplus torque converting unit 8G predicts that the transmission 30 will upshift and proceeds to step S217. Otherwise, it proceeds to step S216.

In step S216, if the vehicle speed is decreasing and the vehicle speed is smaller than the threshold value Vth2, which is slightly larger than the shift point Vth, the surplus torque converting unit 8G predicts that the transmission 30 will downshift and proceeds to step S218. Otherwise, it proceeds to step S220. The operational effects of this alternative example are the same as those of the previously described second embodiment.

The amount by which the threshold vehicle speed values are offset from the shift point vehicle speed can also be determined based on the time delay of the control.

In the previous embodiments, the field magnetic flux can be controlled by changing the field current because the electric motor used is a winding field type motor or other motor that can be controlled by adjusting the field current. In the case of a magnet field type motor (e.g., a brushless DC motor or an AC periodic motor), the strength of the magnets is fixed but the motor can be controlled in substantially the same manner as described in the previous embodiments by controlling the phase and the size of the armature current such that the field magnetic flux is weakened.

Figure 17:
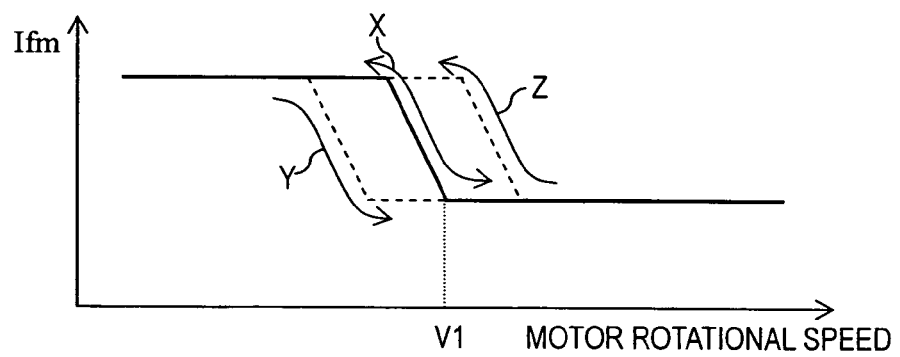
FIG. 17 is a diagram illustrating an alternative approach to adjusting the motor field current in accordance with the second embodiment of the present invention.

Although in the second embodiment a separate motor field current table is prepared for each transmission gear ratio and the table is switched in synchronization with the changing of the gear ratio, the present invention is not limited to such an arrangement. For example, as shown in FIG. 17, it is also acceptable to prepare a single table (portion indicated with the reference symbol X) plotting the motor field current versus the motor rotational speed and establish a prescribed changeover rotational speed V1. When the motor rotational speed is in the low speed region below the changeover rotational speed V1, the motor field current is determined from the standpoint of maximum torque control. Conversely, when the motor rotational speed is in the high speed region above the changeover rotational speed V1, the motor field current is reduced from the standpoint weak field control. When it is detected or predicted based on a shift schedule that the transmission 30 will upshift in conjunction with the vehicle speed increasing, the motor control unit 8C switches to weak field control (indicated with the reference symbol Y) even if the motor rotational speed has not reached the changeover rotational speed V1 and reduces the field current value such that the induced voltage E is reduced early. Meanwhile, when it is detected or predicted that the transmission 30 will downshift in conjunction with the vehicle speed decreasing, the motor control unit 8C switches to maximum torque control (indicated with the reference symbol Y) even if the motor rotational speed is above the changeover rotational speed V1 and increases the field current value such that the induced voltage E is increased early. Thus, the same operational effects as described previously can be obtained by switching between maximum torque control and weak field control of the electric motor 4 in accordance with the shifting of the gear ratio of the transmission 30.

All other operational effects are substantially the same as those of the first embodiment.

As used herein to describe the preceding embodiments, the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention.

The term "configured" as used herein to describe a component, section or part of a device includes hardware and/or software that is constructed and/or programmed to carry out the desired function. Moreover, terms that are expressed as "means-plus function" in the claims should include any structure that can be utilized to carry out the function of that part of the present invention. The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

This application claims priority to Japanese Patent Application No. 2003-355124. The entire disclosure of Japanese Patent Application No. 2003-355124 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A vehicle drive force control apparatus comprising:
    a main drive source configured and arranged to drive a first wheel;
    an electric generator configured and arranged to be driven by the main drive source;
    an electromechanical device configured and arranged to receive electric power from the electric generator;
    a controller operatively coupled to at least one of the electric generator and electromechanical device, the controller comprising
        a predicting section configured to predict a sudden acute change in one of
            a rotational speed of the main drive source and
            a voltage delivered from the electric generator to the electromechanical device, and
        an output stabilizing section configured to adjust one of
            a field current of the electric generator in advance of the acute change to suppress a change in an output of the electric generator that will result from the sudden acute change in the rotational speed of the main drive source, and
            a magnitude of a field magnetic flux of the electromechanical device in advance of the acute change to suppress a change in an output of the electromechanical device that will result from the sudden acute change in the voltage delivered from the electric generator to the electromechanical device; and
    a transmission installed in a torque transmission path between the main drive source and the first wheel driven by the main drive source,
    the predicting section being configured to predict the acute change in the rotational speed of the main drive source based on detecting a gear shifting indication of the transmission; and
    the output stabilizing section being further configured to change the field current of the electric generator in advance upon predicting that the transmission will shift to a different gear ratio with the change in the field current of the electric generator being made in accordance with the shift.

2. The vehicle drive force control apparatus as recited in claim 1, wherein
    the output stabilizing section is configured to control the field current of the electric generator such that an output voltage of the electric generator corresponds to a target voltage of the electromechanical device; and
    the output stabilizing section is configured to change the field current of the electric generator toward a field current value corresponding to the rotational speed that the main drive source will have after the rotational speed changes before the acute change in rotational speed of the main drive source actually occurs.

3. A vehicle drive force control apparatus comprising:
a main drive source configured and arranged to drive a first wheel;
an electric generator configured and arranged to be driven by the main drive source;
an electromechanical device configured and arranged to receive electric power from the electric generator;
a controller operatively coupled to at least one of the electric generator and electromechanical device, the controller comprising
a predicting section configured to predict a sudden acute change in one of
a rotational speed of the main drive source and
a voltage delivered from the electric generator to the electromechanical device, and
an output stabilizing section configured to adjust one of
a field current of the electric generator in advance of the acute change to suppress a change in an output of the electric generator that will result from the sudden acute change in the rotational speed of the main drive source, and
a magnitude of a field magnetic flux of the electromechanical device in advance of the acute change to suppress a change in an output of the electromechanical device that will result from the sudden acute change in the voltage delivered from the electric generator to the electromechanical device; and
a transmission installed in a torque transmission path between the main drive source and the first wheel driven by the main drive source,
the predicting section being configured to predict the acute change in the rotational speed of the main drive source based on detecting a gear shifting indication of the transmission;
the transmission being configured to change gear ratios in accordance with a shift command and to execute the gear ratio change when a prescribed delay period has elapsed after receiving a shift command; and
the output stabilizing section being configured to change the field current of the electric generator in accordance with a content of the shift command upon detecting that shift command has been issued.

4. The vehicle drive force control apparatus as recited in claim 3, wherein
the output stabilizing section is configured to control the field current of the electric generator such that an output voltage of the electric generator corresponds to a target voltage of the electromechanical device; and
the output stabilizing section is configured to change the field current of the electric generator toward a field current value corresponding to the rotational speed that the main drive source will have after the rotational speed changes before the acute change in rotational speed of the main drive source actually occurs.

5. The vehicle drive force control apparatus as recited in claim 4, wherein,
the electromechanical device is an electric motor configured and arranged to drive a second wheel that mechanically driven by the main drive source.

6. A vehicle drive force control apparatus comprising:
a main drive source configured and arranged to drive a first wheel;
an electric generator configured and arranged to be driven by the main drive source;
an electromechanical device configured and arranged to receive electric power from the electric generator; and
a controller operatively coupled to at least one of the electric generator and electromechanical device, the controller comprising
a predicting section configured to predict a sudden acute change in one of
a rotational speed of the main drive source and
a voltage delivered from the electric generator to the electromechanical device, and
an output stabilizing section configured to adjust one of
a field current of the electric generator in advance of the acute change to suppress a change in an output of the electric generator that will result from the sudden acute change in the rotational speed of the main drive source, and
a magnitude of a field magnetic flux of the electromechanical device in advance of the acute change to suppress a change in an output of the electromechanical device that will result from the sudden acute change in the voltage delivered from the electric generator to the electromechanical device,
the output stabilizing section is configured to control the field current of the electric generator such that an output voltage of the electric generator corresponds to a target voltage of the electromechanical device; and
the output stabilizing section is configured to change the field current of the electric generator toward a field current value corresponding to the rotational speed that the main drive source will have after the rotational speed changes before the acute change in rotational speed of the main drive source actually occurs.

7. A vehicle drive force control apparatus comprising:
a main drive source configured and arranged to drive a first wheel;
an electric generator configured and arranged to be driven by the main drive source;
an electromechanical device configured and arranged to receive electric power from the electric generator;
a controller operatively coupled to at least one of the electric generator and electromechanical device, the controller comprising
a predicting section configured to predict a sudden acute change in one of
a rotational speed of the main drive source and
a voltage delivered from the electric generator to the electromechanical device, and
an output stabilizing section configured to adjust one of
a field current of the electric generator in advance of the acute change to suppress a change in an output of the electric generator that will result from the sudden acute change in the rotational speed of the main drive source, and
a magnitude of a field magnetic flux of the electromechanical device in advance of the acute change to suppress a change in an output of the electromechanical device that will result from the sudden acute change in the voltage delivered from the electric generator to the electromechanical device; and
a transmission installed in a torque transmission path between the main drive source and the first wheel driven by the main drive source,
the predicting section being configured to predict the acute change in the rotational speed of the main drive source based on detecting a gear shifting indication of the transmission;

the output stabilizing section being configured to control the field current of the electric generator such that an output voltage of the electric generator corresponds to a target voltage of the electromechanical device; and the output stabilizing section being configured to change the field current of the electric generator toward a field current value corresponding to the rotational speed that the main drive source will have after the rotational speed changes before the acute change in rotational speed of the main drive source actually occurs.

* * * * *